United States Patent
Tokunaga

(10) Patent No.: US 8,281,158 B2
(45) Date of Patent: Oct. 2, 2012

(54) SEMICONDUCTOR INTEGRATED CIRCUIT

(75) Inventor: Yasuhiro Tokunaga, Tokyo (JP)

(73) Assignee: Lapis Semiconductor Co., Ltd., Kanagawa (JP)

( * ) Notice: Subject to any disclaimer, the term of this patent is extended or adjusted under 35 U.S.C. 154(b) by 1202 days.

(21) Appl. No.: 12/076,485

(22) Filed: Mar. 19, 2008

(65) Prior Publication Data

US 2008/0297233 A1 Dec. 4, 2008

(30) Foreign Application Priority Data

May 30, 2007 (JP) .................... 2007-143464

(51) Int. Cl.
*G06F 1/32* (2006.01)
(52) U.S. Cl. .............. 713/300; 713/320; 713/340
(58) Field of Classification Search .......... 713/300, 713/320, 340
See application file for complete search history.

(56) References Cited

U.S. PATENT DOCUMENTS 7,087,439 B2 * 8/2006 Ku .................. 438/6
2007/0164787 A1 * 7/2007 Grochowski et al. ........ 326/46
2007/0180902 A1 * 8/2007 Sherwood et al. ........ 73/204.26
2008/0294821 A1 * 11/2008 Su ........................... 710/110

FOREIGN PATENT DOCUMENTS

JP H08-136621 A 5/1996

OTHER PUBLICATIONS

"Voltage controlled in response to tolerance, Power consumption of the logic LSI reduced for 30%", Nikkei Electronics Jul. 17, 2006, vol. 930, page at 59, published by Nikkei BP.

* cited by examiner

*Primary Examiner* — Paul Yanchus, III
(74) *Attorney, Agent, or Firm* — Rabin & Berdo, P.C.

(57) ABSTRACT

A semiconductor integrated circuit having an internal circuit group, which includes at least one internal circuit, includes a plurality of process monitoring circuits, each of which is disposed at a different location in the internal circuit group, each of the process monitoring circuits, which is operated in response to a power supply voltage, detecting monitoring data in the area where one of the process monitoring circuits is disposed, and a power supply voltage generating circuit generating the power supply voltage corresponding to the monitoring data, and supplying the power supply voltage to the internal circuit group.

11 Claims, 8 Drawing Sheets

SEMICONDUCTOR INTEGRATED CIRCUIT

CROSS-REFERENCE TO RELATED APPLICATION

This application claims the priority benefit of Japanese Patent Application No. 2007-143464, filed May 30, 2007, the entire disclosure of which is incorporated herein by reference.

BACKGROUND OF THE INVENTION

1. Field of the Invention

The invention relates to a semiconductor integrated circuit for supplying optimized power supply voltages to an internal circuit group.

2. Description of the Related Art

Generally, a semiconductor integrated circuit includes a plurality of logic circuits, one of which is a Central Processing Unit (CPU) for which a high speed arithmetic process with low power consumption is demanded. In such a semiconductor integrated circuit, through a semiconductor manufacturing process, namely a wafer process, transistors or its wirings are not manufactured uniformly among the chips. This means that the production tolerance may be occurred during the wafer process.

Because of the production tolerance, when a drain/source current value is set at smaller than that being expected, the arithmetic process speed of the CPU becomes slow. To prevent the processing speed of the CPU from slowing, a high voltage is applied for increasing the drain/source current value. On the other hand, when a drain/source current value is set at higher than that being expected, the power consumption by the CPU becomes larger. To prevent the power consumption of the CPU from becoming larger, a low voltage is applied.

According to a non patent literature document (Reference 1), which is listed below, a semiconductor integrated circuit in a form of a chip includes logic circuits, a process monitoring circuit, a trimming logic circuit for generating a trimming logic signal, such as a voltage regulating circuit for optimizing the voltage value. The semiconductor integrated circuit disclosed in the Reference 1 optimizes the voltage value for each chip, which is manufactured in the different lot, by activating the process monitoring circuit in response to the production tolerance. Since the semiconductor integrated circuit generates a few-bit trimming signal by which a power supply voltage generating circuit generates such an optimized voltage, the power supply voltage generating circuit generates the optimized voltage internally corresponding to the trimming signal, and supplies such an optimized voltage to the internal logic circuits.

Further, according to a Japanese patent publication (Reference 1), which is also listed below, a delay-time measuring circuit in a power supply voltage supplying device sends a first pulse to a delay circuit provided in a semiconductor device and measures the estimated value of the delay time of the semiconductor device from a second pulse, which is the response signal of the first pulse. Then, in response to the measuring result, the power supply control circuit determined the optimized power supply voltage, which is applied to the semiconductor device.

Reference 1: Nikkei Electronics 2006.7.17, vol. 930, page at 59, published by Nikkei BP Reference 2: Japanese Laid open patent publication No. H08-136621A Moreover, because of influence of the process tolerance, the transistors formed in the same wafer are not manufactured uniformly as well as the transistors formed in the different lot. In other words, there are variations of characteristics of each transistor formed in the single wafer. Recent years, because of the miniaturization of the chip, the process tolerance bears influence on the internal circuits. The process tolerance is caused by a dislocation of a resist mask in a photolithography process or by a failure for controlling the film formation process or the planarization process.

However, the conventional semiconductor integrated circuit disclosed in the Reference 2 can have only one place where the delay-time measuring circuit is disposed. Thus, even when the power-supply voltages values having different values should be applied to circuits formed in the single chip, respectively, because of the result of the process tolerance, the gap among the values of the power-supply voltages cannot be corrected.

Moreover, the process monitoring circuit is relatively large scale circuit because it has a lot of functions, such as detecting monitoring data, processing serial signals, and generating trimming logics. Thus, when a plurality of the delay-time measuring circuits are disposed, the same numbers of the large scaled process monitoring circuits are required. An increase of the monitor circuits causes to increase of the number of wiring for the trimming logics to be transmitted, and to increase of the area of the chip.

Moreover, when the power supply voltage is varied in response to each trimming logic in the power supply voltage generating circuit, the correction of the power supply voltage is made by correction signals passing through terminals specialized for the correction signals for every voltage to be corrected. Thus, such terminals should be formed in the chip so that the area of the chip is further increased.

SUMMARY OF THE INVENTION

An objective of the invention is to solve the above-described problem and to provide a semiconductor integrated circuit for supplying the optimized power supply voltage to internal circuits without increasing the area of the chip when the process tolerance causes the variation of the characteristics of the circuit elements.

The objective is achieved by a semiconductor integrated circuit having an internal circuit group which includes at least one internal circuit, which includes a plurality of process monitoring circuits, each of which is disposed at a different location in the internal circuit group, each of the process monitoring circuits, which is operated in response to a power supply voltage, detecting monitoring data in the area where one of the process monitoring circuits is disposed, and a power supply voltage generating circuit generating the power supply voltage corresponding to the monitoring data, and supplying the power supply voltage to the internal circuit group.

BRIEF DESCRIPTION OF THE DRAWINGS

The invention will be more particularly described with reference to the accompanying drawings, in which.

DETAILED DESCRIPTION OF THE PREFERRED EMBODIMENTS

The first through the third embodiments and the alternatives of the invention as to a semiconductor integrated circuit are explained together with drawings as follows. In each drawing, the same reference numbers designate the same or similar components through all embodiments.

The First Embodiment

Figure 1:
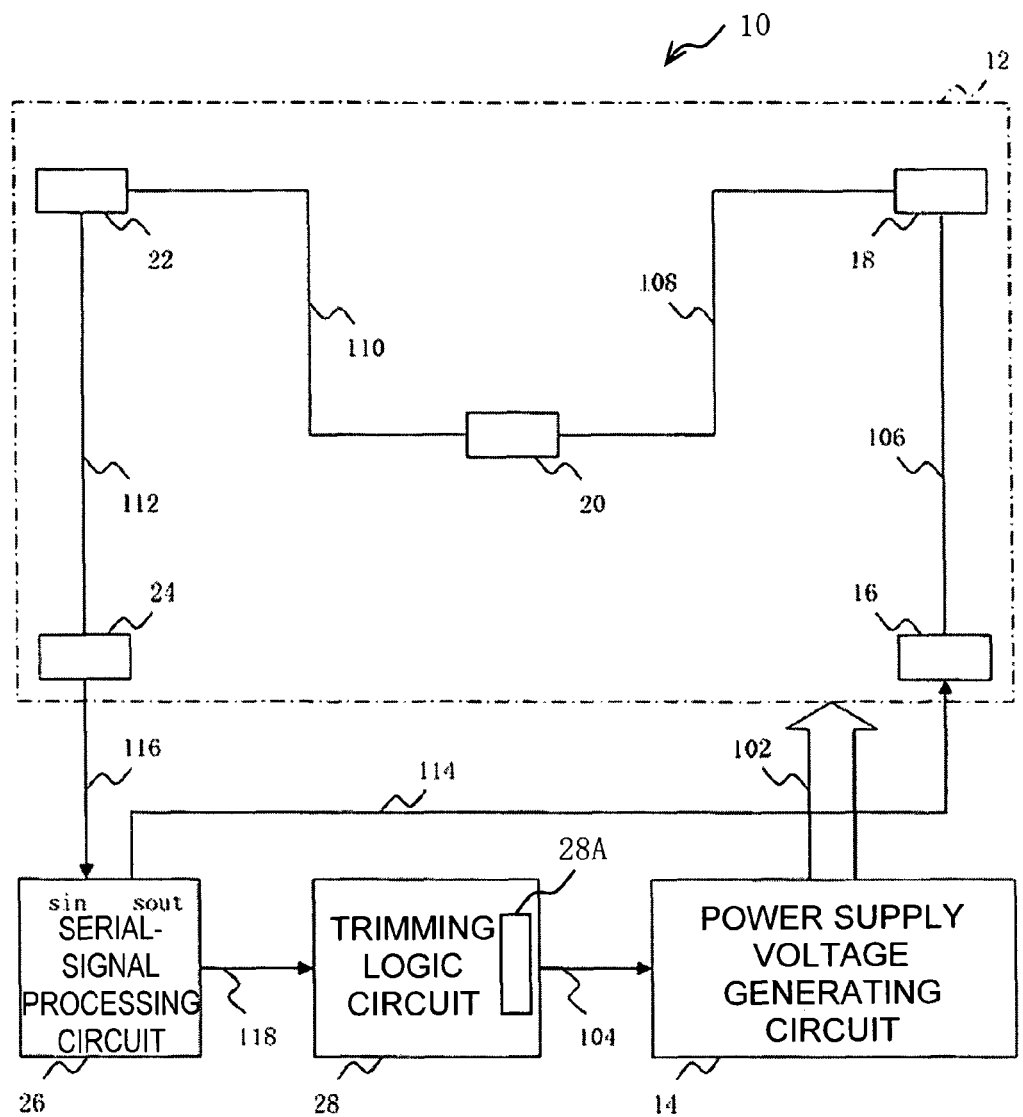
FIG. 1 is a circuit diagram of a semiconductor integrated circuit, according to a first embodiment.

FIG. 1 is a circuit diagram of a semiconductor integrated circuit 10, according to a first embodiment. As shown in FIG. 1, the semiconductor integrated circuit 10 includes an internal circuit group 12 including a plurality of internal circuits, a power supply voltage generating circuit 14, a serial-signal processing circuit 26 and a trimming logic circuit 28. In the semiconductor integrated circuit 10, the power supply voltage generating circuit 14 supplies an optimized power supply voltage to the internal circuit group 12. In the internal circuit group 12, a plurality of process monitoring circuits 16, 18, 20, 22 and 24 are disposed. The serial-signal processing circuit 26 corrects data which are obtained by each of the process monitoring circuits 16, 18, 20, 22 and 24, and then, the trimming logic circuit 28 determines the optimized power supply voltage to be supplied to the internal circuit group 12 by the power supply voltage generating circuit 14, based on the monitoring data. For the sake of the brevity, some illustration and its explanation, which are not related to the invention directly, are omitted.

As described above, the semiconductor integrated circuit 10 includes the internal circuit group 12 having at least one unillustrated logical circuit, such as a central processing unit formed on a single chip. In the first embodiment, such a group of the internal circuits is called the internal circuit group 12.

The power supply voltage generating circuit 14, which supplies the power supply voltage 102 to each of the internal circuits in the internal circuit group 12, varies the value of the power supply voltage 102 in response to a trimming logic signal 104 outputted from the trimming logic circuit 28. With more on that part, the power supply voltage generating circuit 14 receives the three (3)-bit trimming logic trim[2:0] as the trimming logic signal 104, steps down an external power supply voltage inputted from unillustrated external power supply, and varies the value of the internal power supply voltage 102 of the semiconductor integrated circuit 10 in response to a trimming logic signal 104.

The process monitoring circuits 16, 18, 20, 22 and 24, each of which is disposed at a different location in the internal circuit group 12, detect monitoring data at each location. Each of the process monitoring circuits 16, 18, 20, 22 and 24 is operable in response to the power supply voltage 102 supplied from the power supply voltage generating circuit 14, and detects the monitoring data corresponding to the power supply voltage 102 being applied. While it is possible to dispose many process monitoring circuits more than five in the actual device, only five process monitoring circuits 16, 18, 20, 22 and 24 are used and illustrated in the first embodiment for the sake of brevity and for avoiding the complicated explanation, and thus, the monitoring data are corrected at five locations in the first embodiment.

The process monitoring circuits 16, 18, 20, 22 and 24 may be scattered throughout the internal circuit group 12. However, while some internal circuits in the internal circuit group 12 at the peripheral area of the chip may not be adjacent to the other internal circuits in the internal circuit group 12, some internal circuits in the internal circuit group 12 at the center area of the chip may generally be surrounded by the other internal circuits in the internal circuit group 12, in the chip. Thus, compared with the transistors formed in the peripheral area of the chip, the transistors formed in the center area may have different characteristics on its operation. Thus, it is necessary to place at least one process monitoring circuit in the center area, and at least one process monitoring circuit in the peripheral area in order to monitor the process trend, which causes to from the transistors having different characteristics on its operation, depending on its location where the transistors are formed. Alternatively, the area that the internal circuit group 12 is formed is divided into the plural, and each of the process monitoring circuits 16, 18, 20, 22 and 24 may be disposed in one of the divided areas. Further, all of the process monitoring circuits 16, 18, 20, 22 and 24 may be disposed in the area adjacent to the internal circuits in which intensive processes are performed.

The process monitoring circuits 16, 18, 20, 22 and 24, which are considered as a serial transfer circuit by connecting serially with wires 106; 108, 110 and 112, are connected to the serial-signal processing circuit 26 so that the monitoring data being observed at each process monitoring circuits 16, 18, 20, 22 and 24 are transmitted to the serial-signal processing circuit 26.

The process monitoring circuit 16, which is the first stage of the serial transfer circuit, receives serial data from the serial-signal processing circuit 26 via wiring 114, initially. Then, the process monitoring circuits 18, 20, 22, 24, which are the second, the third, the fourth, and the fifth stages of the serial transfer circuit, respectively, receives the serial data in serial via the wirings 106, 108, 110 and 112, respectively.

Each of the process monitoring circuits 16, 18, 20 and 22 transmits the detected monitoring data as the serial data via the wires 106, 108, 110 and 112, respectively. The process monitoring circuit 24, which is the last stage of the serial transfer circuit, transmits the detected monitoring data as the serial data via the wire 116 to the serial-signal processing circuit 26.

Figure 2:
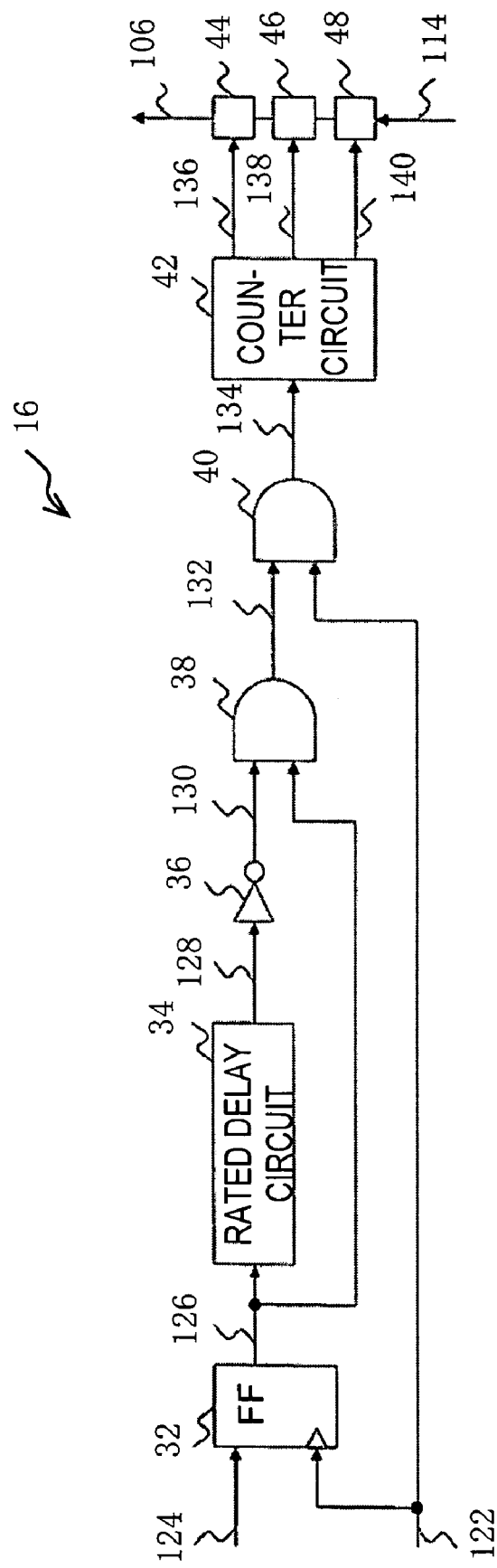
FIG. 2 is a circuit diagram of a process monitoring circuit used in the semiconductor integrated circuit shown in FIG. 1.

As shown in FIG. 2, which is a circuit diagram of the process monitoring circuit 16, the process monitoring circuit 16 includes a Flip-Flop circuit 32, a rated delay circuit 34, a NOT circuit 36, AND circuits 38 and 40, a counter circuit 42 and data latch circuits 44, 46, 48. Each of the other process monitoring circuits 18, 20, 22 and 24 may have a circuit structure similar to the process monitoring circuit 16.

The process monitoring circuit 16, which receives an input signal 124 having a high level for a predetermined pulse period and supplies the input signal 124 to the Flip-Flop circuit 32, detects the monitoring data corresponding to the delay process performed by the rated delay circuit 34, which is operated in response to the input signal 124. The predetermined pulse period of the input signal 124 may be set in advance, or may be determined by the volume of the monitoring data detected by the process monitoring circuit 16.

The Flip-Flop circuit 32, which is operated in response to an internal clock signal 122, generates a node signal 126 based on the input signal 124, and then, supplies the node signal to the rated delay circuit 34 and the AND circuit 38 from its Q-output terminal.

The rated delay circuit 34 delayed the node signal 126 for a predetermined period, and outputs a delayed node signal 128 to the NOT circuit 36. The NOT circuit 36 outputs a node signal 130 to the AND circuit 37. The predetermined period for delaying the output timing of the node signal 126 may be determined in advance by performing a computer simulation. According to the first embodiment of the inventions, the computer simulation provides a number of the clock count, which is obtained by the counter 42, for storing 3-bit trimming logic 136, 138 and 140 in the data latch circuits 44, 46 and 48 by each bit so that the delay-period set by the rated delay circuit 34 may be adjusted in order to obtain the number of the clock count that would be the target. Further, the delay-period set by the rated delay circuit 34 may be adjusted in order to operate the process monitoring circuit 16 by a predetermined target speed.

Figure 4:
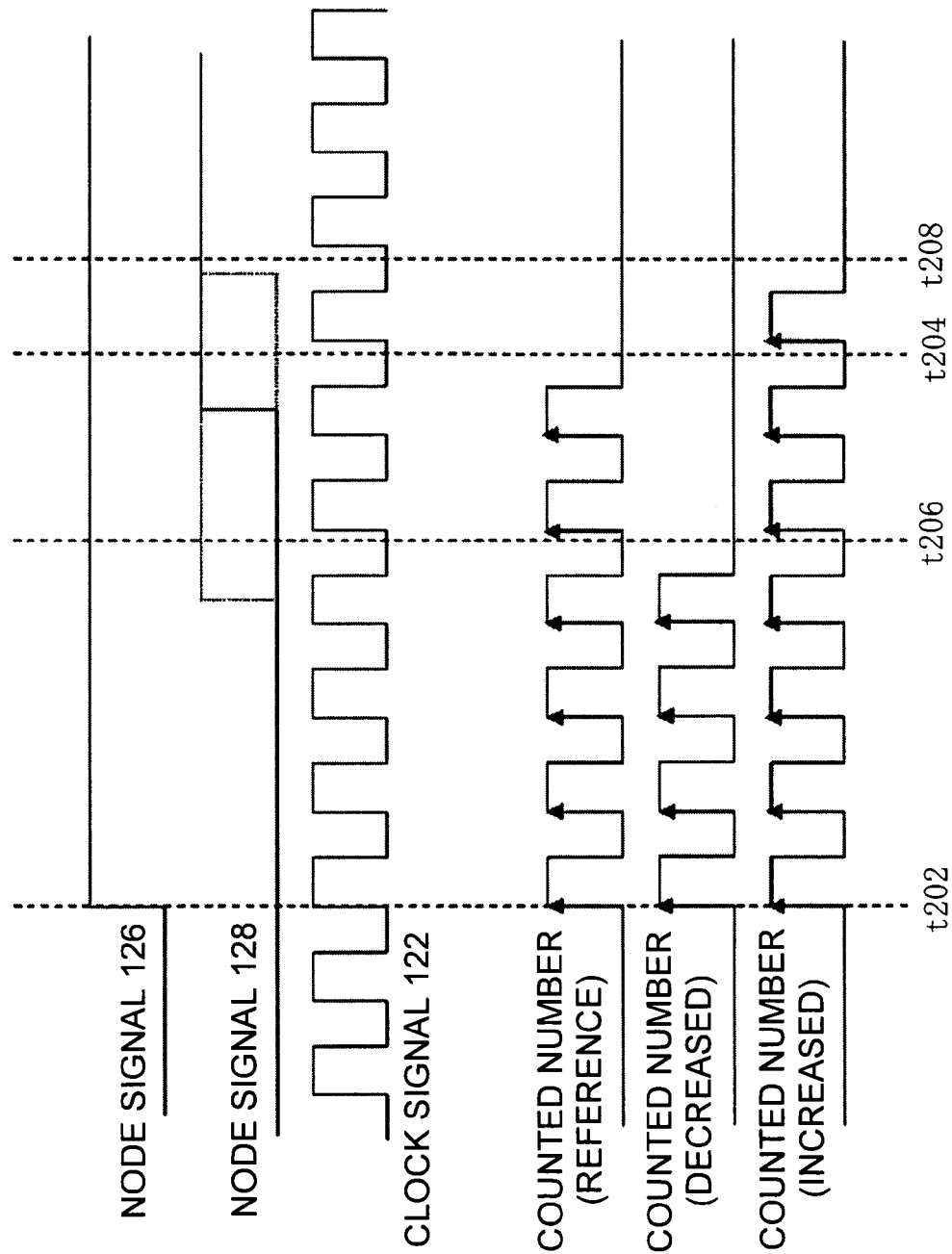
FIG. 4 is a timing-chart for explaining an operation order of the process monitoring circuit shown in FIG. 2.

For example, as shown in FIG. 4, which is a timing-chart for explaining an operation order of the process monitoring circuit 16 shown in FIG. 2, during the period starting at time t202, at which the node signal 126 outputted from the Flip-Flop circuit 32 rises, and ending at time t204 at which the delayed node signal 128 outputted from the rated delay circuit 34 rises, the number of times that the clock signal 122 rises and falls, which is the number of the clock count, can be estimated by the computer simulation. Thus, it is possible to predict the time that the delayed node signal 128 should rise in order to obtain the predetermined number of the clock count. The delay-period set by the rated delay circuit 34 may be adjusted for obtaining such the delayed node signal 128.

In the first embodiment, as shown in FIG. 4, the clock count is six (6) because it is set that the delayed node signal 128 rises at time t204. It is possible to set the number of the clock count at four (4) by the adjustment of the delay-period, which is performed by shifting the time that the delayed node signal 128 rises, from t204 to t206. As well, it also is possible to set the number of the clock count at seven (7) by the adjustment of the delay-period, which is performed by shifting the time that the delayed node signal 128 rises, from t204 to t208.

The AND circuit 38 receives the node signal 130 outputted from the NOT circuit 36 and the node signal 126 outputted from the Flip-Flop circuit 32, and outputs an node signal 132 corresponding to the delay-period set by the rated delay circuit 34.

The AND circuit 40 receives the node signal 132 outputted from the AND circuit 38 and the internal clock signal 122, and outputs an node signal 134 corresponding to the clock signal during the delay-period set by the rated delay circuit 34.

The counter circuit 42 counts a number of times that the node signal 134 rises and falls. In other words, the counter circuit 42 counts how many time the node signal 134 is clocked during the delay-period set by the rated delay circuit 34. The counter circuit 42 outputs the counting result as three (3)-bit counter-bit signal (each bit is designated as the reference numbers 136, 138 and 140, respectively) to the data latch circuits 44, 46 and 48.

Figure 3:
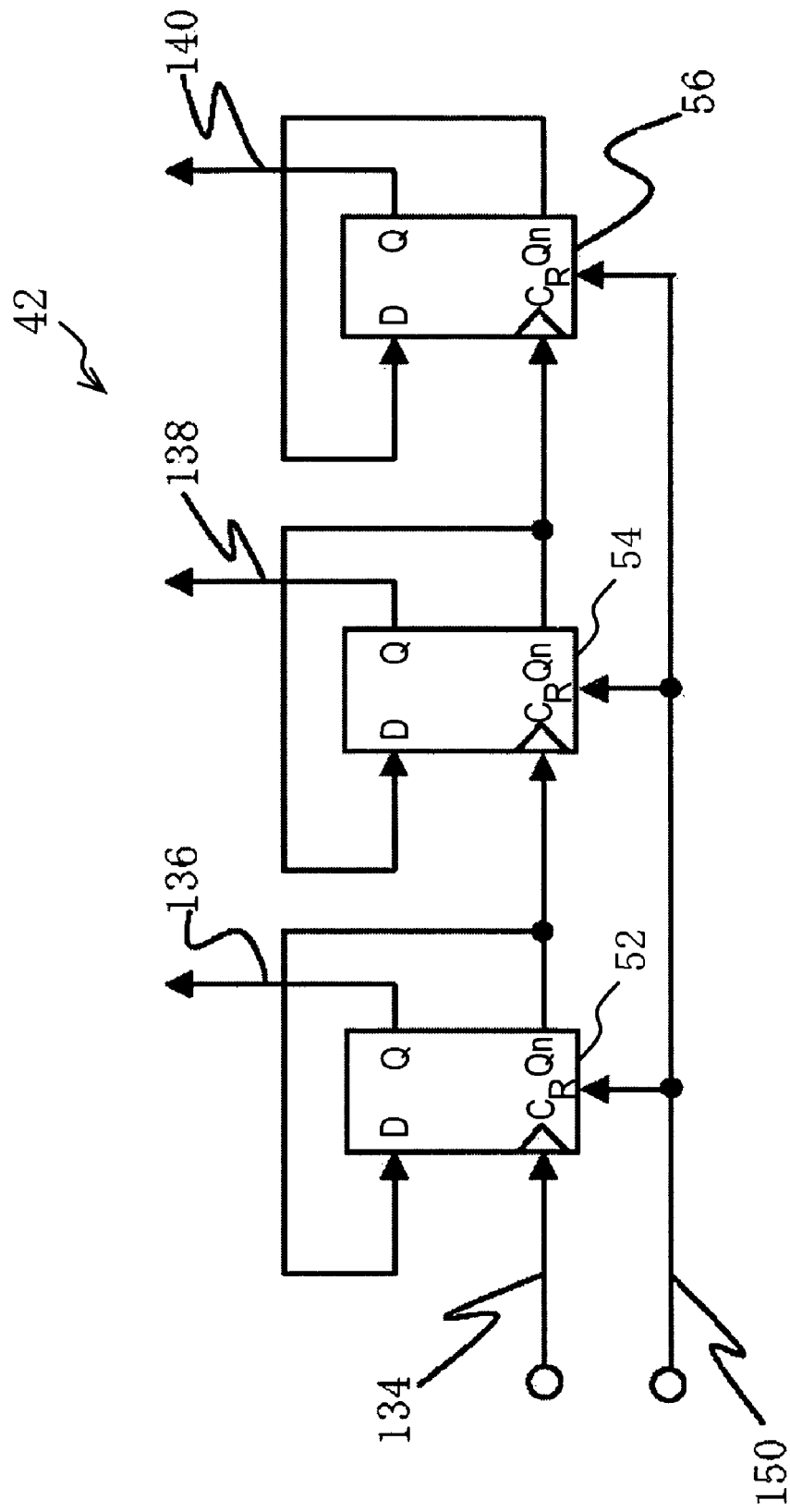
FIG. 3 is a circuit diagram of a counter circuit used in the process monitoring circuit shown in FIG. 2.

As shown in FIG. 3, which is a circuit diagram of the counter circuit 42 used in the process monitoring circuit 16 shown in FIG. 2, the counter circuit 42 includes three Flip-Flop circuits 52, 54 and 56. The inputted node signal 134 is processed in the Flip-Flop circuits 52, 54 and 56 in succession. The Flip-Flop circuits 52, 54 and 56 may be operated in response to a reset signal 150.

The Flip-Flop circuit 52, which is the first stage, includes a D terminal (D), a Q terminal (Q), a Qn terminal, a Reset terminal (R) and a clock terminal (C). The Flip-Flop circuit 52 receives the node signal 134 at the clock terminal (C). Then, the Flip-Flop circuit 52 generates the first bit of the counter-bit signal (first bit counter-bit signal 136) in response to the node signal 134. Simultaneously, the Flip-Flop circuit 52 outputs the first bit of the counter-bit signal from its Qn terminal to the Flip-Flop circuit 54, which is the second stage, and feeds back it to itself at its D terminal.

The Flip-Flop circuit 54 which is the second stage, includes a D terminal (D), a Q terminal (Q), a Qn terminal, a Reset terminal (R) and a clock terminal (C). The Flip-Flop circuit 54 receives the first counter-bit signal from the Flip-Flop circuit 52 at the clock terminal (C). Then, the Flip-Flop circuit 54 generates the second bit of the counter-bit signal (the second counter-bit signal 138) in response to the first counter-bit signal. Simultaneously, the Flip-Flop circuit 54 outputs the second bit of the counter-bit signal from its Qn terminal to the Flip-Flop circuit 564, which is the third stage, and feeds back it to itself at its D terminal. As well, the Flip-Flop circuit 56 generates the third bit of the counter-bit signal (third counter-bit signal 140) in response to the second counter-bit signal.

The data latch circuits 44, 46 and 48 are connected in succession. The data latch circuit 48, which is the first stage, is connected to the serial-signal processing circuit 26 via the wire 114, and the data latch circuit 44, which is the last stage, is connected to the process monitoring circuit 18, which is the next stage, via the wire 106.

The data latch circuits 44, 46 and 48 latches and stores the first through third counter-bit signals 136, 138 and 140, respectively, which are outputted from the counter circuit 42. The first through third counter-bit signals 136, 138 and 140 are transmitted as the monitoring data in accordance with the serial transfer from the wire 114 to the wire 106

The serial-signal processing circuit 26 outputs the serial data from its output terminal Sout via the wire 114 to the serial transfer circuit including the process monitoring circuits 16, 18, 20, 22 and 24, and receives the monitoring data at its input terminal Sin via the wire 116, which are sent in succession from the serial transfer circuit.

The serial-signal processing circuit 26 collects the serially-transferred monitoring data, each of which are specifically related to the operation period, are obtained at one of the process monitoring circuits 16, 18, 20, 22 and 24 and are passed through the serial transfer circuit. Then, the serial-signal processing circuit 26 outputs the monitoring data signal 118 indicating such the monitoring data to the trimming logic circuit 28. The serial-signal processing circuit 26 may receive 3-bit monitoring data as the serially-transferred monitoring data 116, which are obtained at five locations where the process monitoring circuits 16, 18, 20, 22 and 24 are placed, and then, it may generates monitoring data signals part1[2:0] ~part5[2:0], in each of which one of the monitoring data are stored.

The trimming logic circuit 28 generates the trimming logic signal 104 in response to the monitoring data signal 118 supplied from the serial-signal processing circuit 26, and then it supplies the trimming logic signal 104 to the power supply voltage generating circuit 14. The trimming logic circuit 28 generates the 3-bit trimming logic trim[2:0] as the logic signal 104 in response to the 3-bit monitoring data signals part1[2:0]~part5[2:0] corresponding to the monitoring data signal 118.

The trimming logic circuit 28 according to the first embodiment includes a comparison circuit 28A, and obtains the trimming logic 104 corresponding to a difference between the monitoring data and the reference data, which is a result of the operation of the comparison circuit 28A. The trimming logic circuit 28 may has a conversion table showing the relationship between the differences and the trimming logics. When the trimming logic circuit 28 has such a conversion table, the trimming logic circuit 28 can obtain the trimming logic by referring the conversion table, based on the difference.

The trimming logic circuit 28 selects one of the five monitoring data signals part1[2:0]~part5[2:0] in order to make the power supply voltage 102 generated by the power supply voltage generating circuit 14 be the highest. The trimming logic circuit 28 may have a memory circuit such a data latch circuit for holding the current monitoring data as the reference data used for generating the timing logic at the next cycle.

The trimming logic circuit 28 predetermines an initial trimming logic for obtaining an initial power supply voltage 102. Thus, at the time of the start-up of the semiconductor integrated circuit 10, the initial trimming logic is used for the trimming logic 104. By predetermining initial data corresponding to the initial trimming logic, the trimming logic circuit 28 may obtains the initial trimming logic as the trimming logic 104 when the predetermined monitoring data are the same as the initial data on the value. The trimming logic circuit 28 may have another memory circuit such a data latch circuit for holding the initial trimming logic, the initial data and the predetermined data table, which are obtained by the computer simulation at the time of designing the semiconductor integrated circuit 10.

Figure 5:
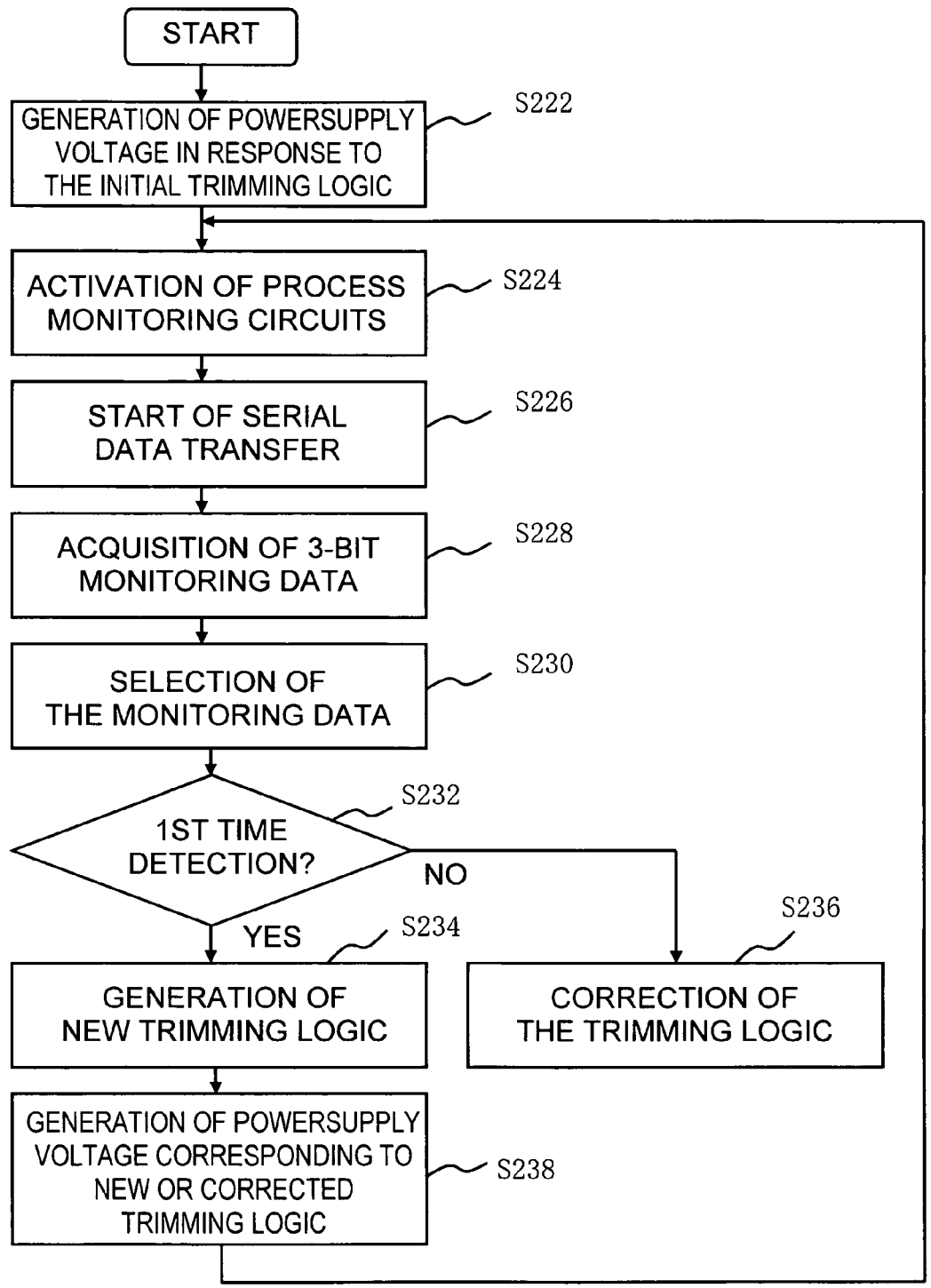
FIG. 5 is a flow-chart circuit for explaining an operation order of the semiconductor integrated circuit shown in FIG. 1.

Next, the operation for supplying the power supply voltage to each internal circuit in the internal circuit group 12 in the semiconductor integrated circuit 10 of the first embodiment of the invention is explained with reference to FIG. 4 and FIG. 5. FIG. 4 is a timing-chart for explaining an operation order of the process monitoring circuit 16 shown in FIG. 2 and FIG. 5 is a flow-chart circuit for explaining an operation order of the semiconductor integrated circuit 10 shown in FIG. 1.

In Step S222, when the semiconductor integrated circuit 10 is activated, the power supply voltage generating circuit 14 generates the power supply voltage 104 in response to the initial trimming logic, and supplied it to the internal circuit group 12.

In Step S224, each of the process monitoring circuits 16, 18, 20, 22 and 24 located in the internal circuit group 12 is activated by inputting the input signal 124 and the internal clock signal 122 to the Flip-Flop circuit 32.

For example, as shown in FIG. 2, the node signal 126, and the delayed node signal 128 are generated in the Flip-Flop circuit 32 and the rated delay circuit 32, respectively, in the process monitoring circuit 16. As shown in FIG. 4, the node signal 126 rises at t202, and the delayed node signal 128 rises at t204. In the process monitoring circuit 16, the number of times that the clock signal 122 rises and falls (the clock count) during the period stating at t202 and ending at t204 is detected.

Further, the counter circuit 42 in the process monitoring circuit 16 converts the clock count during the period stating at t202 and ending at t204 into the number expressed in binary form, then generates the 3-bit counter bit signals 136, 138 and 140. Each bit of the 3-bit counter bit signal 136, 138 or 140 is stored in one of the data latch circuits 44, 46 and 48.

In Step S226, when the power supply voltage generating circuit 14 starts supplying the power supply voltage 104, the serial data transfer is started among the process monitoring circuit 16, 18, 20, 22 and 24 and the serial-signal processing circuit 26 wherein the serial data are outputted from the serial-signal processing circuit 26 through the wire 116, and are fed back to the serial-signal processing circuit 26 passing through the wires 106, 108, 110, 112, and 116 in succession.

Thus, each bit of the 3-bit counter bit signal 136, 138 or 140 stored in one of the data latch circuits 44, 46 and 48 in the process monitoring circuit 16 is sent on the wire 106 by the serial transfer as the monitoring data. As well as in the process monitoring circuit 16, the 3-bit counter bit signals stored in the process monitoring circuits 18, 20, 22, 24 are transferred in succession as the monitoring data, and finally are inputted to the serial-signal processing circuit 26.

In Step 228, the serial-signal processing circuit 26 may receive 3-bit monitoring data as the serially-transferred monitoring data 116, which are obtained at five locations where the process monitoring circuits 16, 18, 20, 22 and 24 are placed, and then, it may generates the monitoring data signals part1[2:0]~part5[2:0], in each of which one of the monitoring data are stored. Then, the serial-signal processing circuit 26 outputs the monitoring data signal 118 to the trimming logic circuit 28.

In Step 230, the trimming logic circuit 28 selects one of the five monitoring data signals part1[2:0]~part5[2:0] in order to make the power supply voltage 102 generated by the power supply voltage generating circuit 14 be the highest. For example, when the monitoring data is based on the operation time in each process monitoring circuit 16, 18, 20, 22 or 24, the high power supply voltage should be applied to the slow speed circuits in the internal circuit group 12 in order to make the operation time fast. Thus, one of the monitoring data, which shows the slowest operation time, is selected by the trimming logic circuit 28, and the power supply voltage generating circuit 14 generates the power supply voltage in response to the selected trimming logic 104 for making the slowest operation time of the internal circuits fast.

In Step S232, it is judged whether or not the data detection by the process monitoring circuits 16, 18, 20, 22 and 24 is the first time. If it is the first time detection, then the flow goes to the Step 234. If it is not the first time detection, then the flow goes to the Step 236.

In Step S234, the monitoring data selected by the trimming logic circuit 28 is compared with the initial reference data to obtain the deference so that the trimming logic is generated in response to the difference. Thus, the trimming logic circuit 28 generates the 3-bit trimming logic trim[2:0] as the trimming logic signal 104 for the next cycle, and outputs it to the power supply voltage generating circuit 14. The selected monitoring data is stored in the trimming logic circuit 28.

In Step 238, the power supply voltage generating circuit 14 generates new power supply voltage based on trimming logic signal 104 for the next cycle, which is generated by the trimming logic circuit 28. The newly generated power supply voltage 102 is supplied to the internal circuit group 12, then, the flow returns to the Step 224.

The similar operations are repeated in the Steps 224~230. That is, the monitoring data newly obtained in the process monitoring circuits 16, 18, 20, 22 and 24 are sent to the serial-signal processing circuit 26. Then, the monitoring data as the monitoring data signals 118 are transmitted to the trimming logic circuit 28. Then, the trimming logic circuit 28 selects one of the five monitoring data signals part1[2:0]~part5[2:0] in order to make the power supply voltage 102 generated by the power supply voltage generating circuit 14 be the highest. Then, the flow goes to the Step S232. In the Step S232, as described above, it is judged whether or not the data detection by the process monitoring circuits 16, 18, 20, 22 and 24 is the first time. Because this is the second data detection, the flow goes to the Step S236.

In Step S236, the monitoring data selected by the trimming logic circuit 28 is compared with the monitoring data in the previous cycle, which are stored therein, to obtain the deference so that new trimming logic is generated in response to the difference. Thus, the trimming logic circuit 28 generates the 3-bit trimming logic trim[2:0] as the trimming logic signal 104 for the next cycle, and outputs it to the power supply voltage generating circuit 14. The monitoring data selected in the Step S234 is replaced to the monitoring data selected in the Step S236 for the next cycle. Then, in Step S238, the power supply voltage generating circuit 14 generates new power supply voltage based on trimming logic signal 104 for the next cycle, which is generated by the trimming logic circuit 28.

Although the operation shown in FIG. 4 may be repeated to optimize the power supply voltage supplied to the internal circuit group 12 all the time, the operation of the trimming correction may be repeated for a predetermined times until the power supply voltage 102 is stabilized so that the power supply voltage 102 may be corrected twice for instance.

Further, when the power supply voltage 102 is repeatedly generated, it may be controlled that the pulse signal 124 rises in response to the generation of the trimming logic 104 or the power supply voltage 102, or in response to the reset signal for the semiconductor integrated circuit 10.

As described above, according to the semiconductor integrated circuit 10, the process for trimming correction and the process for generating the power supply voltage are controlled in response to the number of times for generating the power supply voltage, then, the final trimming logic is determined. As the result, the power supply voltage corresponding to the final trimming logic can be maintained.

Moreover, when the area where the internal circuit group 12 is disposed is divided into a plurality of the sub-areas while each process monitoring circuit is disposed in one of the sub-areas, the monitoring data for each sub-area are detected. Each of the monitoring data is transmitted with its location information so that the trimming logic circuit can generates the trimming logic for every location. In response to the trimming logic, the power supply voltage generating circuit 14 can generates the power supply voltage different in each location. Therefore, the highest logic in each location can be selected so that the most optimized power supply voltage can be supplied. In this case, since the power supply voltage different in each location is generated, the number of the power supply voltage generating circuits 14 and the trimming logic circuits 28 are required as the same number as that of the sub-areas.

The Second Embodiment

Figure 6:
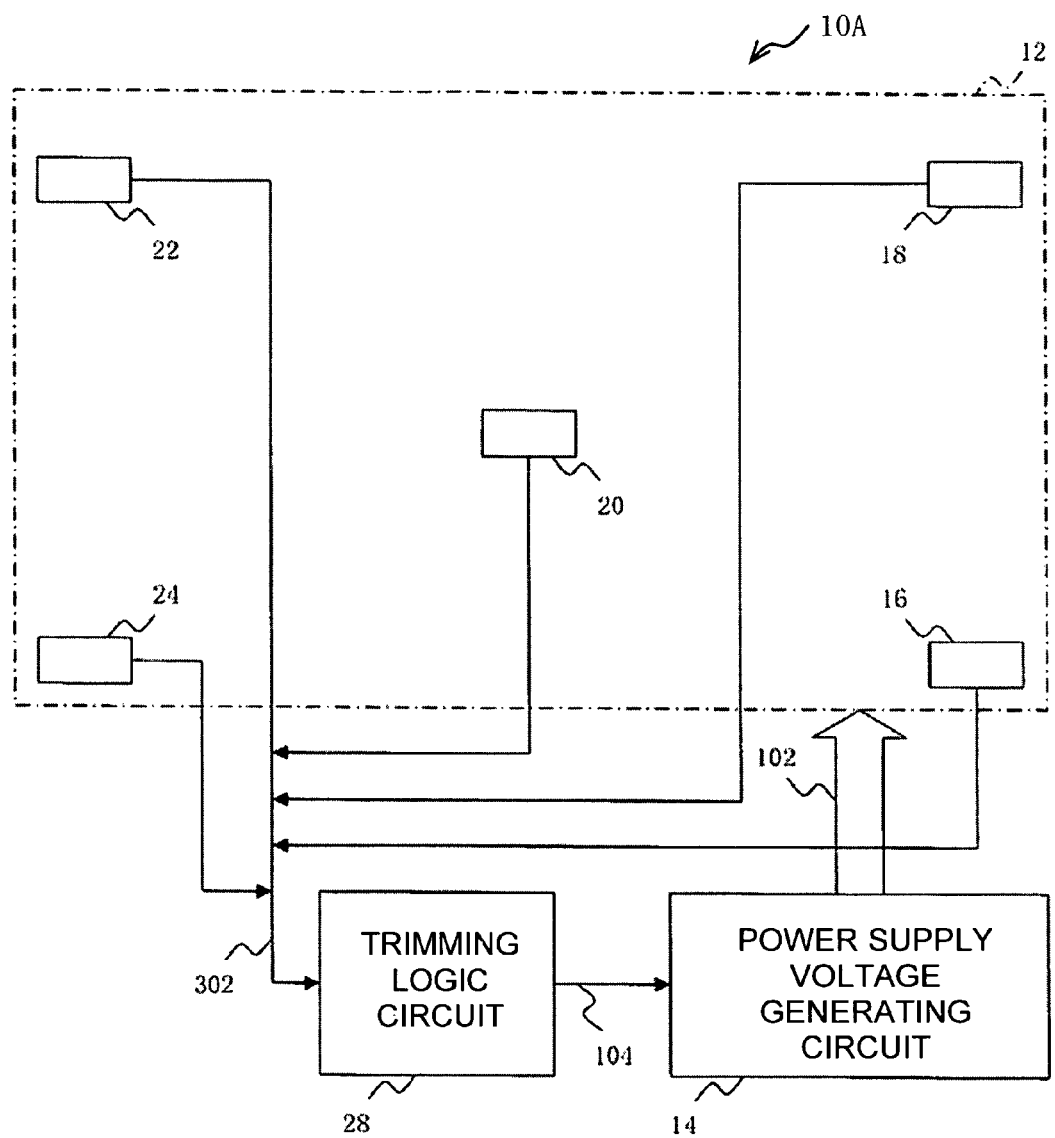
FIG. 6 is a circuit diagram of a semiconductor integrated circuit, according to a second embodiment.

FIG. 6 is a circuit diagram of a semiconductor integrated circuit 10A, according to a second embodiment. As shown in FIG. 6, the semiconductor integrated circuit 10A includes a trimming logic circuit 28, a power supply voltage generating circuit 14 and an internal circuit group 12 in which process monitoring circuits 16, 18, 20, 22 and 24 are disposed. In the second embodiment, each of the process monitoring circuits 16, 18, 20, 22 and 24 is directly connected to the trimming logic circuit 28 so that the detected monitoring data 302 at each location can be transmitted to the trimming logic circuit 28 directly. In the semiconductor integrated circuit 10A, each of some circuits has a circuit structure similar to the circuit in the semiconductor integrated circuit 10, and the operations of these circuits are also similar to these of the circuits in the semiconductor integrated circuit 10. Thus, the detail explanation of these circuits is omitted for the sake of brevity.

In each process monitoring circuit 16, 18, 20, 22 or 24, when each bit 136, 138 and 140 of the 3-bit counter bit signal is stored in one of the data latch circuits 44, 36 and 48, the 3-bit counter bit signal is outputted as the monitoring data 302 from each of the process monitoring circuits 16, 18, 20, 22 and 24.

In the semiconductor integrated circuit 10A, since the monitoring data can be detected by the process monitoring circuits 16, 18, 20, 22 and 24 at five locations, the 3-bit monitoring data part1[2:0]~part5[2:0] for five location are supplied as the monitoring data 302 to the trimming logic circuit 28.

As described above, according to the semiconductor integrated circuit 10A of the second embodiment, since each of the process monitoring circuits 16, 18, 20, 22 and 24 is directly connected to the trimming logic circuit 28, it is not necessary to dispose any serial-signal processing circuit so that the circuit structure can be simplified. Further, the trimming correction, which optimizes the power supply voltage, can be performed automatically when the production tolerance is occurred in the single chip during the wafer process. In the second embodiment, although the number of the wirings may be increased, it is effective for the semiconductor integrated circuit having fewer locations at which the monitoring data are detected.

The Third Embodiment

Figure 7:
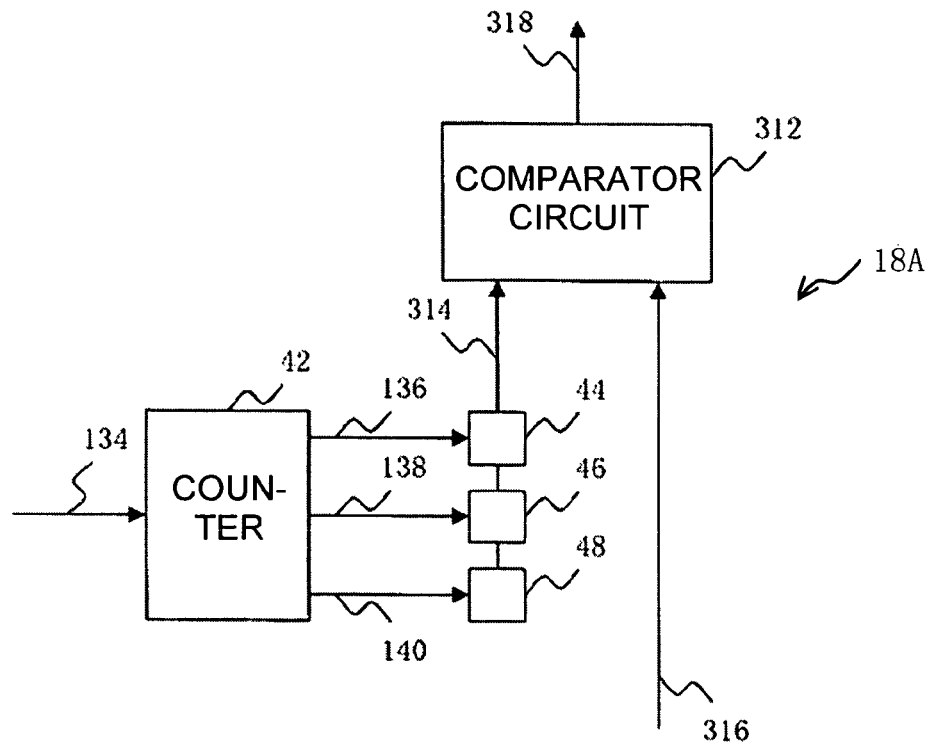
FIG. 7 is a circuit diagram of an alternative process monitoring circuit used in a semiconductor integrated circuit shown in FIG. 9.

A semiconductor integrated circuit 10B according to the third embodiment is explained as follows with reference to FIGS. 7, 8 and 9. FIG. 7 is a circuit diagram of an alternative process monitoring circuit 18A used in a semiconductor integrated circuit shown in FIG. 9, FIG. 8 is a circuit diagram of a comparator circuit used in the s alternative process monitoring circuit shown in FIG. 7, and FIG. 9 is a circuit diagram of a semiconductor integrated circuit, according to a third embodiment.

A process monitoring circuit 18A shown in FIG. 7 includes comparator circuit 312. Each of the other process monitoring circuits 16A, 20A, 22A and 24A includes a circuit structure similar to that of the process monitoring circuit 18A. As shown in FIG. 9, these process monitoring circuits 16A, 18A, 20A, 22A and 24A are connected in succession via wirings 332, 334, 336, 338 and 340 in order to create a serial transfer circuit. In the semiconductor integrated circuit 10B, each of some circuits has a circuit structure similar to the circuit in the semiconductor integrated circuit 10 or 10A, and the operations of these circuits are also similar to these of the circuits in the semiconductor integrated circuit 10 or 10A. Thus, the detail explanation of these circuits is omitted for the sake of brevity.

In the process monitoring circuit 18A, the comparator circuit 312 receives the 3-bit counter-bit signal, which is the monitoring data 314 of the current stage, at its first input terminal from the data latch circuits 44, 46 and 48. The comparator circuit 312 also receives the 3-bit counter-bit signal, which is the monitoring data 316 of the previous stage, at its first input terminal from the process monitoring circuit 16A via the wiring 332. The comparator circuit 312 compares the monitoring data 314 of the current stage with the monitoring data 316 of the previous stage, and selects one 318 of the monitoring data 314 and 316, which is higher. The selected monitoring data 318 is serial-transferred to the process monitoring circuit 20A at the next stage.

Figure 8:
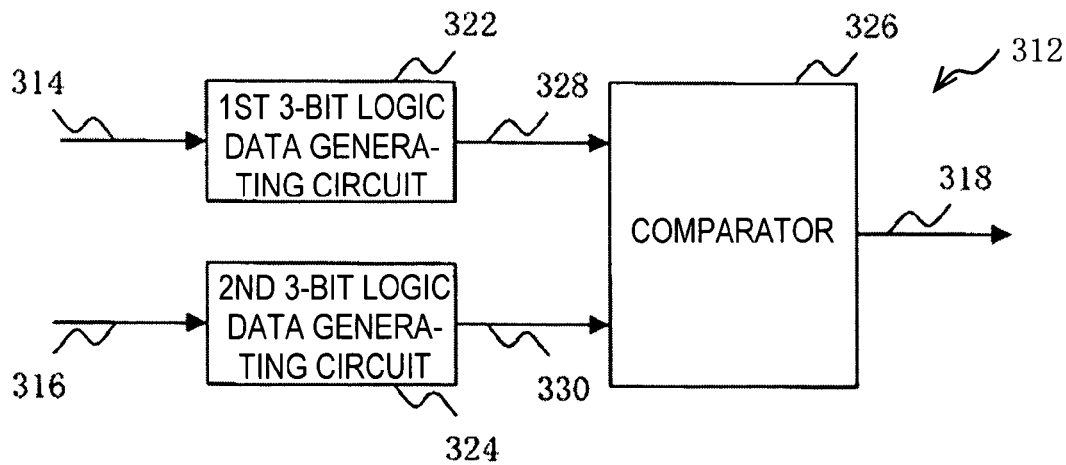
FIG. 8 is a circuit diagram of a comparator circuit used in the s alternative process monitoring circuit shown in FIG. 7.
Figure 9:
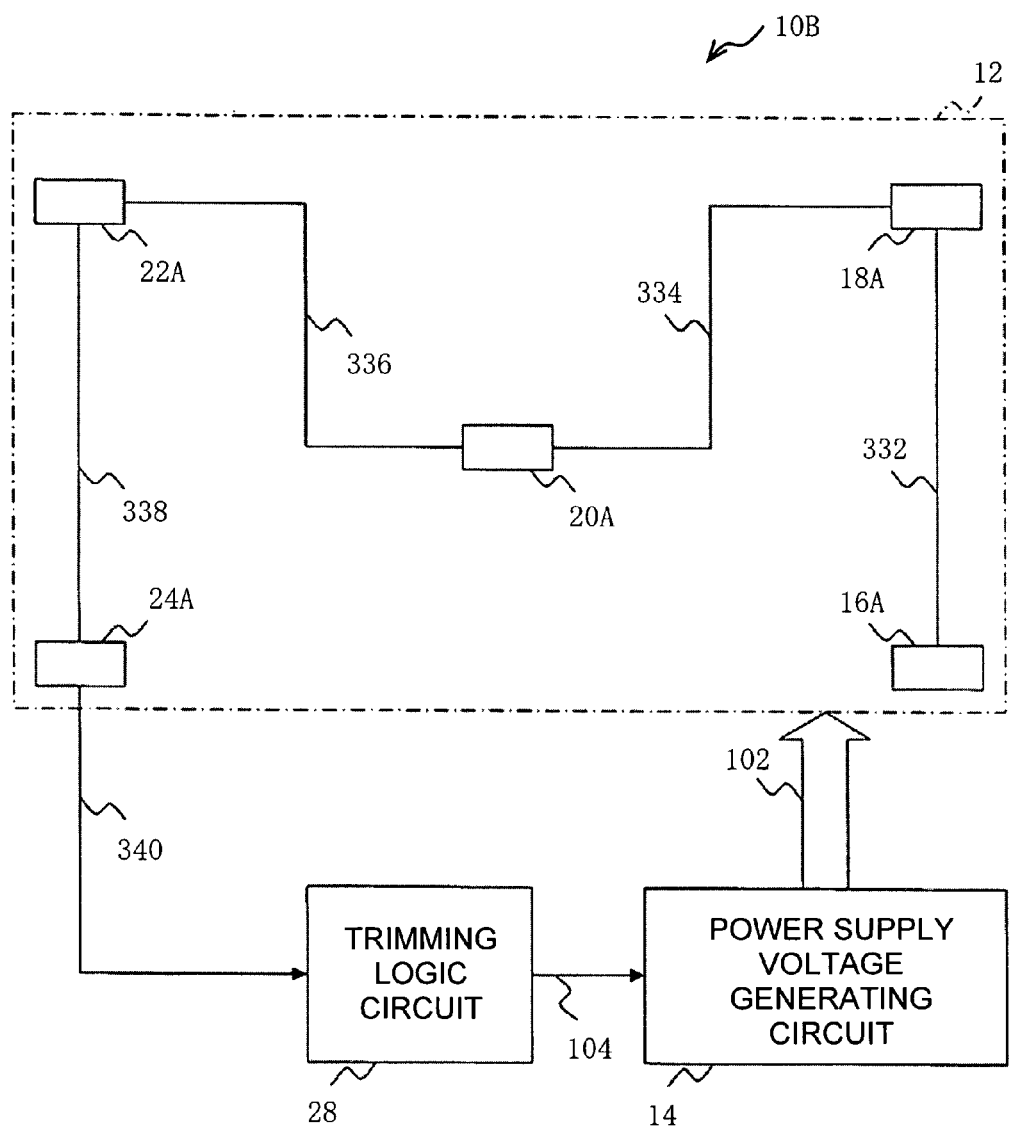
FIG. 9 is a circuit diagram of a semiconductor integrated circuit, according to a third embodiment.

As shown in FIG. 8, the comparator circuit 312 includes a first and a second 3-bit logic data generating circuits 322 and 324, each of which generates a first and a second 3-bit logic data 328 or 330 in response to one of the monitoring data 314 and 316, which are the data of either the current stage or the previous stage. The first and the second 3-bit logic data 328 or 330 are inputted to a comparator 326, and one of the first and the second 3-bit logic data 328 or 330, which is higher, is outputted as the monitoring data 318 as a result of the comparison performed by the comparator 326.

As described above, since the comparator circuit 312 in the process monitoring circuit 18A uses the monitoring data 316 of the previous stage, the process monitoring circuit 16A, which is the first stage of the serial transfer circuit, may transmit the monitoring data 318 detected by itself to the process monitoring circuit 18A at the next stage via the wiring 332 without performing the comparison process.

On the other hand, the process monitoring circuit 24A, which is the last stage of the serial transfer circuit, outputs the monitoring data 318, which is the final comparison result performed in the serial transfer circuit, as a result of the comparison performed by the comparison circuit 312 to the trimming logic circuit 28 via the wiring 340.

According to the semiconductor integrated circuit 10B of the third embodiment, since each of the process monitoring circuits 16A, 18A, 20A, 22A and 24A includes comparator circuit 312, each of the process monitoring circuits 16A, 18A, 20A, 22A and 24 compares the trimming logic 314 generated by itself with the trimming logic 316 generated by the one of the process monitoring circuit, which is the previous stage, and outputs one of them, which is higher, to the process monitoring circuit, which is the next stage, in succession. Thus, only the 3-bit signal is transferred all the time so that the serial-signal processing circuit is not required without increasing the wiring connections of the process monitoring circuit while the trimming correction, which optimizes the power supply voltage, can be performed automatically when the production tolerance is occurred in the single chip during the wafer process, as well as the first and second embodiments.

Moreover, when the area where the internal circuit group 12 is disposed is divided into a plurality of the sub-areas, the combination of the process monitoring circuit, the serial-signal processing circuit, the trimming logic circuit and/or the power supply voltage generating circuit is disposed in one of the sub-areas. In other words, a plurality of such a combination may be disposed in the single chip. When some of the combinations are not used in a certain occasion, the operation of such the combination may be halted so that it is possible to reduce the power consumption.

While the invention has been described with reference to illustrative embodiments, this description is not intended to be construed in a limiting sense. Thus, shapes, size and physical relationship of each component are roughly illustrated so the scope of the invention should not be construed to be limited to them. Further, to clarify the components of the invention, hatching is partially omitted in the cross-sectional views. Moreover, the numerical description in the embodiment described above is one of the preferred examples in the preferred embodiment so that the scope of the invention should not be construed to limit to them.

Various other modifications of the illustrated embodiment will be apparent to those skilled in the art on reference to this description. Therefore, the appended claims are intended to cover any such modifications or embodiments as fall within the true scope of the invention.

What I claim is:

1. A semiconductor integrated circuit having an internal circuit group which includes at least one internal circuit, comprising:
    a plurality of process monitoring circuits, each of which is disposed at a different location in the internal circuit group, each of the process monitoring circuits, which is operated in response to a power supply voltage, detecting monitoring data in the area where one of the process monitoring circuits is disposed; and
    a power supply voltage generating circuit generating the power supply voltage corresponding to the monitoring data, and supplying the power supply voltage to the internal circuit group;
    wherein one of the process monitoring circuits includes a comparator circuit, which compares the monitoring data detected by itself in a current stage with the monitoring data in a previous stage of a serial transfer connection created by connecting each of the process monitoring circuits in succession, and
    wherein the comparator circuit selects and transmits one of the monitoring data, which is higher, to a process monitoring circuit in a next stage of the serial transfer connection.

2. A semiconductor integrated circuit as claimed in claim 1 wherein each process monitoring circuit includes a delay circuit for delaying its input signal for a predetermined period.

3. A semiconductor integrated circuit as claimed in claim 2, wherein at least one of the process monitoring circuits is disposed in a center area of the internal circuit group, and wherein at least one of the process monitoring circuits is disposed in a peripheral area of the internal circuit group.

4. A semiconductor integrated circuit as claimed in claim 3, wherein each of the process monitoring circuits is disposed in one of sub-areas, which are formed by dividing an area where the internal circuit group is disposed, the monitoring data are detected in each sub-areas.

5. A semiconductor integrated circuit as claimed in claim 1, further comprising:
    a trimming logic circuit generating a trimming logic, which controls the power supply voltage,
    wherein the power supply voltage generating circuit generates the power supply voltage, based on the trimming logic; and
    wherein the trimming logic circuit includes a first route that a predetermined reference trimming logic is used as the trimming logic and a second route that new trimming logic is generated by correcting a trimming logic, which is generated by the monitoring data in a previous cycle.

6. A semiconductor integrated circuit as claimed in claim 5, wherein the trimming logic circuit, which selects one of the monitoring data to make the power supply voltage be highest, includes a comparison circuit, which compares the selected monitoring data with reference data, wherein the trimming logic circuit determines the trimming logic corresponding to the comparison result performed by the comparison circuit, and wherein the trimming logic circuit holds the selected monitoring data as the reference data used for generating the timing logic at a next cycle.

7. A semiconductor integrated circuit as claimed in claim 5, wherein each process monitoring circuit is directly connected to the trimming logic circuit and each process monitoring circuit supplies the monitoring data to the trimming logic circuit directly.

8. A semiconductor integrated circuit as claimed in claim 5, wherein at least one of the process monitoring circuits is disposed in a center area of the internal circuit group, and wherein at least one of the process monitoring circuits is disposed in a peripheral area of the internal circuit group.

9. A semiconductor integrated circuit as claimed in claim 5, wherein each of the process monitoring circuits is disposed in one of sub-areas, which are formed by dividing an area where the internal circuit group is disposed, the monitoring data are detected in each sub-areas.

10. A semiconductor integrated circuit as claimed in claim 1, wherein at least one of the process monitoring circuits is disposed in a center area of the internal circuit group, and wherein at least one of the process monitoring circuits is disposed in a peripheral area of the internal circuit group.

11. A semiconductor integrated circuit as claimed in claim 1, wherein each of the process monitoring circuits is disposed in one of sub-areas, which are formed by dividing an area where the internal circuit group is disposed, the monitoring data are detected in each sub-areas.

* * * * *